US010671606B2

(12) United States Patent
Konik et al.

(10) Patent No.: US 10,671,606 B2
(45) Date of Patent: *Jun. 2, 2020

(54) MATERIALIZED QUERY TABLES WITH SHARED DATA

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 15/833,559

(22) Filed: Dec. 6, 2017

(65) Prior Publication Data

US 2018/0096030 A1  Apr. 5, 2018

Related U.S. Application Data

(63) Continuation of application No. 14/536,778, filed on Nov. 10, 2014, now Pat. No. 9,928,277.

(51) Int. Cl.
*G06F 16/2453* (2019.01)
*G06F 16/27* (2019.01)
(Continued)

(52) U.S. Cl.
CPC .... *G06F 16/24539* (2019.01); *G06F 16/2282* (2019.01); *G06F 16/2365* (2019.01);
(Continued)

(58) Field of Classification Search
CPC ............... G06F 16/24539; G06F 16/2393
See application file for complete search history.

(56) References Cited

U.S. PATENT DOCUMENTS 5,999,943 A * 12/1999 Nori ................. G06F 16/24562
6,334,128 B1 * 12/2001 Norcott ............... G06F 16/2393
(Continued)

OTHER PUBLICATIONS

IBM, "Materialized Views with Access Control: Towards Authorization-Aware BI Applications," An IP.com Prior Art Database Technical Disclosure, Original Publication Date: Nov. 4, 2008, IP.com Electronic Publication: Nov. 4, 2008, IP.com No. IPCOM000176069D, 21 pgs.
(Continued)

*Primary Examiner* — David T. Brooks
(74) *Attorney, Agent, or Firm* — Jared L. Montanaro

(57) ABSTRACT

A computer system can generate a materialized query table (MQT) for data from a base table that has a plurality of rows and columns that each contain stored data. The computer system can receive a query to data stored in a row from the base table. The system can identify a column in the row and determine that data from a cell in the row and the column is above a threshold memory size. The system can generate, in response to determining that the data being above the threshold memory size, an MQT that includes data for the row and that includes a reference pointer that points to a location shared with another table.

11 Claims, 8 Drawing Sheets

(51) Int. Cl.
*G06F 16/22* (2019.01)
*G06F 16/23* (2019.01)
*G06F 16/2455* (2019.01)

(52) U.S. Cl.
CPC ...... *G06F 16/2393* (2019.01); *G06F 16/2453* (2019.01); *G06F 16/24562* (2019.01); *G06F 16/27* (2019.01)

(56) References Cited

U.S. PATENT DOCUMENTS

| | | | |
|---|---|---|---|
| 6,738,790 | B1 | 5/2004 | Klein et al. |
| 6,738,792 | B1* | 5/2004 | Muthusamy ........ G06F 9/30018 708/200 |
| 6,829,616 | B2 | 12/2004 | Chen et al. |
| 9,589,016 | B2 | 3/2017 | Konik et al. |
| 9,679,013 | B2 | 6/2017 | Konik et al. |
| 9,679,014 | B2 | 6/2017 | Konik et al. |
| 9,740,721 | B2 | 8/2017 | Konik et al. |
| 2004/0225666 | A1* | 11/2004 | Hinshaw .............. G06F 16/2393 |
| 2006/0047696 | A1* | 3/2006 | Larson ................ G06F 16/2393 |
| 2006/0075006 | A1* | 4/2006 | Yu ........................ G06F 16/289 |
| 2007/0073657 | A1 | 3/2007 | Santosuosso |
| 2008/0016131 | A1 | 1/2008 | Sandorfi et al. |
| 2008/0114780 | A1 | 5/2008 | Man et al. |
| 2009/0006365 | A1 | 1/2009 | Liu et al. |
| 2009/0198716 | A1 | 8/2009 | Howarth et al. |
| 2009/0228432 | A1* | 9/2009 | Thiyagarajan .... G06F 16/24539 |
| 2011/0196857 | A1 | 8/2011 | Chen et al. |
| 2012/0233148 | A1 | 9/2012 | Chen et al. |
| 2013/0159284 | A1 | 6/2013 | Santosuosso |
| 2013/0173544 | A1 | 7/2013 | Barsness et al. |
| 2015/0363441 | A1 | 12/2015 | Konik et al. |
| 2015/0363445 | A1 | 12/2015 | Konik et al. |
| 2016/0098462 | A1* | 4/2016 | George ............... G06F 16/2393 707/609 |
| 2016/0132557 | A1 | 5/2016 | Konik et al. |
| 2016/0132558 | A1 | 5/2016 | Konik et al. |

OTHER PUBLICATIONS

IBM, "<QMProject>Method of Recommending a Consolidated Set of Materialized Query Tables," An IP.com Prior Art Database Technical Disclosure, Original Publication Date: Feb. 24, 2010, IP.com Electronic Publication: Feb. 24, 2010, IP.com No. IPCOM000193441D, 5 pgs.

Mell et al, "The NIST Definition of Cloud Computing", Recommendations of the National Institute of Standards and Technology, Sep. 2011, 7 pages, NIST Special Publication 800-145, U.S. Department of Commerce, Gaithersburg, MD.

Accelerated Examination Support Document, U.S. Appl. No. 15/098,567, dated Apr. 7, 2016, 19 pgs.

List of IBM Patents or Patent Applications Treated As Related, Dec. 6, 2017, 2 pgs.

* cited by examiner

MATERIALIZED QUERY TABLES WITH SHARED DATA

BACKGROUND

The present disclosure relates to materialized query tables (MQTs), and more specifically, to generating MQTs that share data from a base table.

Data can be stored in and accessed from a database. In various embodiments, a database contains a base table, which has rows of data that can be accessed using queries. A query can be one or more statements interconnected with logical operators. The base table can be queried to obtain a result (data) to the query. In certain embodiments, a base table can contain large amounts of data, and the time it takes to return a result to a query can be significant. Furthermore, in particular embodiments, the same data can be accessed multiple times. As a result, the same or similar queries can be used multiple times.

Materialized query tables (MQT) are defined based upon the result of a query. The data that is contained in an MQT can derived from one or more base tables on which the materialized query table definition is based. In many respects, an MQT is a kind of materialized view. Both views and MQTs are defined on the basis of a query. An MQT stores the query results as data in memory location separate from the underlying table(s). This allows the data stored in the MQT to be used instead of the data that is in the underlying tables. Materialized query tables can significantly improve the performance of queries, especially complex queries. If the optimizer determines that a query or part of a query could be resolved using an MQT, the query might be rewritten to take advantage of the MQT.

SUMMARY

Embodiments are directed toward a method for generating a materialized query table (MQT) for data from a base table having a plurality of rows and columns that contain stored data. A computer system can receive a query to data stored in a row from the base table and identify a column in the row. The computer system can determine that data from a cell in the row and the column is above a threshold memory size. In response to determining that the data is above the threshold memory size, the computer system can generate the MQT from data for the row and with a reference pointer that points to a location that is shared with another table.

According to embodiments, a database manager system is provided for creating a materialized query table (MQT) for data from a base table having a plurality of rows and columns that contain stored data. The system can include one or more computer processor circuits that are configured to; receive a query to a row from the base table; identify a column in the row; determine that data from the column is above a threshold memory size; and generate, in response to determining that the data is above the threshold memory size, the MQT with a reference pointer that points to a location of the data that is in another table.

Various embodiments are directed toward a computer program product for generating a materialized query table (MQT) for data from a base table having a plurality of rows and columns that contain stored data, the computer program product comprising a computer readable storage medium having program instructions embodied therewith, wherein the computer readable storage medium is not a transitory signal per se, the program instructions executable by a processing circuit to cause the processing circuit to perform a method comprising: receiving a query to a row from the base table; identifying a column in the row; determining that data from a cell in the row and the column is above a threshold memory size; and generating, in response to determining that the data is above the threshold memory size, the MQT from data for the row and with a reference pointer that points to a location that is shared with another table.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
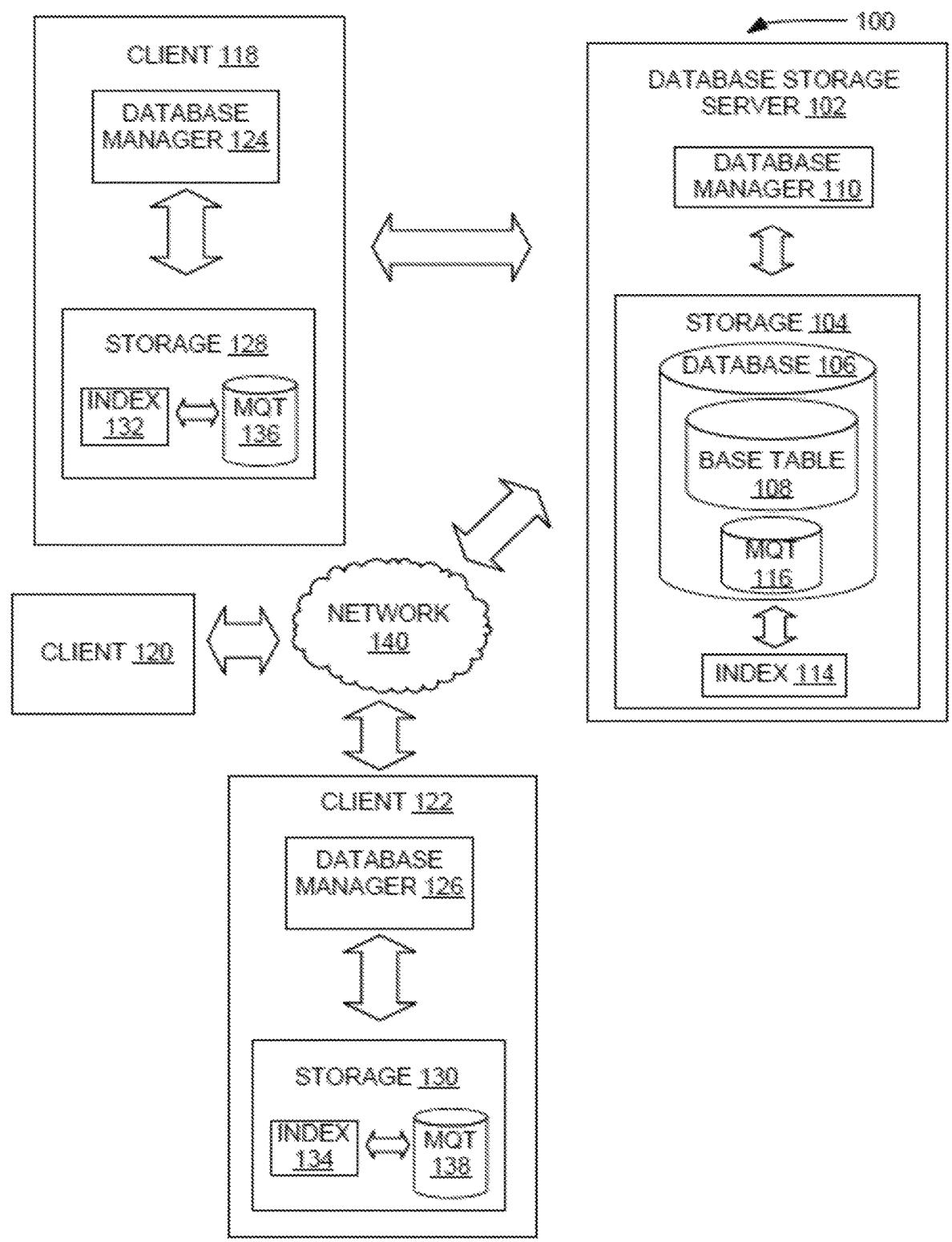
FIG. 1 depicts a system 100 for creating an MQT for data from a base table, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to materialized query tables (MQTs), more particular aspects relate to generating MQTs that share data from a base table. While the present disclosure is not necessarily limited to such applications, various aspects of the disclosure may be appreciated through a discussion of various examples using this context.

Embodiments of the present disclosure are directed toward generating MQTs that share data from a base table. In various embodiments, large amounts of data (e.g., large objects (LOBs)) may be located in one or more columns of a row that has been queried multiple times. As a result, storing the row in multiple MQTs may reduce the performance of a system where the MQTs are stored and can also use a large amount of storage or memory space.

The term LOB can refer to a set of data types that are designed to hold large amounts of data. For example, a LOB type can be configured to store data up to a certain size (e.g., ranging from 8 terabytes to 128 terabytes) depending on how the database is configured. The use of a specially designed data type can facilitate accessing of, and manipulation of, the data by an application. Consistent with embodiments, there can be specific types of LOBs that are designed for storing data in different formats, which can be useful for different data content. For example, character/textual data can be stored as a character-LOB (CLOB), while image (or other) data could be stored as binary-LOB (BLOB).

According to certain embodiments, when a query is made to a row of a base table, a cell with the large amount of data can be identified. In some instances, this cell can correspond to a LOB column. In certain embodiments, a threshold memory size may be set and the cell with the large amount of data can be compared to the threshold memory size. The result of the query can be the generation of an MQT that includes the row. The system can be configured to use the threshold memory size to determine whether or not the MQT will store the entire data from the cell, or a pointer to another location. For instance, if the memory size of the cell with the large amount of data is above the threshold memory size, the MQT can include a reference pointer (e.g., a LOB locator) that points to another location that stores the large amount of data. In some embodiments, the reference pointer to the large amount of data can point directly to the base table. In certain embodiments, the materialized version of the large amount of data may be stored in another MQT (for another query) or some other storage location used by the database management system. If direct access to the data is subsequently requested, e.g., by a query to the MQT or a request to store the data in a file, the reference pointer can be used to locate the data that satisfies the query.

In particular embodiments, an index can be used in conjunction with the MQT. In various embodiments, a database manager can create the index to locate the MQT that will be used to satisfy the query. In some instances, the index can facilitate sharing of common data items between different MQTs, between MQTs and the base table, or both. When access to an MQT is requested, the index may indicate that a particular materialized object is stored elsewhere, e.g., another MQT or the base table. As discussed herein, the index can be broken down to the cell level, allowing for individual pointers to be created and used based upon the memory size of the cell.

According to various embodiments, a base table can be a temporary table generated from a query over one or more tables. These base tables can be useful to save time and effort. In particular embodiments, the base table can contain results to queries that are similar or have something in common. For example, a base table can be joined from the same tables or created using the same or similar group criteria. In certain embodiments, there can be complex or large amounts of data in a base table. MQTs are tables that can contain information that is derived and summarized from base tables. MQTs can be created to store rows that have been queried multiple times in a more convenient storage location (e.g., a faster or otherwise more easily accessible storage space) by avoiding redundant performance of scanning, aggregation and join operations.

In certain embodiments, a database manager can implicitly create MQTs for rows that have been queried multiple times. For example, when a query is made multiple times to one or more rows of a base table, a database manager can implicitly create an MQT for the query. When the query is made again, the database manager can direct the query to select the row from the MQT rather than the base table. In another embodiment, MQTs can be created by human administrators to store rows that have been queried multiple times. As a result, multiple MQTs can be created for some or all of the data that is located in a base table. Thus, when a query is made, the access times for retrieving the data from the storage location of the corresponding MQT can be less than access times for retrieving the data from the base table.

In various embodiments, multiple queries may query different columns of the same row. As a result, the row may be copied and stored in multiple MQTs. For example, the result for query 1 is located in column 1 of row 1 and the result for query 2 is located in column 2 of row 1. Query 1 and query 2 have been made multiple times and the database manager has generated MQT 1 and MQT 2 and stored row 1 in both MQTs. When query 1 is made again, MQT 1 can be accessed to retrieve the result from column 1 of row 1. When query 2 is made again, MQT 2 can be accessed to retrieve the result from column 2 of row 1.

In particular embodiments, one or more columns of a row may contain data that requires a lot of storage space (e.g., 100 Gigabyte LOBs). Copying the row to multiple MQTs could hinder the performance of the system if the LOB is materialized separately for each MQT. According to certain embodiments, the system can determine that an MQT will not store a separate copy for a cell with a large amount of data. This determination can be based upon the memory size of the cell and the availability of the data in another location. The cell in the MQT can store a reference pointer to other location. If a query to the MQT seeks to retrieve the cell with the large amount of data, the reference pointer can be used to access the large amount of data, e.g., from another MQT or the base table. The data for the cell can then be retrieved for the query. In some embodiments, the reference pointer may point to a separate storage application that was specifically created to store the large amount of data or multiple large amounts of data.

Consistent with embodiments, the system can be configured to make determination as to whether or not to include data in an MQT on a cell by cell basis. This can be particularly useful for handling LOB columns in which the amount of data stored in any particular row can vary significantly. Thus, the system can be configured to directly include, in an MQT, data from one cell of a LOB column, while using a pointer for another cell. Moreover, various embodiments allow for tailoring of the memory threshold sizes used in this decision. For instance, certain data types may be given different memory threshold sizes based. This may account for different expected usage of the data types, different memory constraints, and different performance considerations. For instance, the system could be configured to have a high memory threshold size for binary LOBs (BLOBs) that is higher than a corresponding memory threshold size for character LOBs (CLOBs). Thus, a BLOB cell having the same memory size as a CLOB cell can be treated differently. In certain instances, the memory threshold size can by dynamically adjusted. For instance, the memory threshold size could be dynamically reduced in response to increased memory usage. The change could then be implemented on future MQT creation events and, if desired, memory used by cells in existing MQTs could also be freed if they are above the new threshold memory size.

As a particular example, an enterprise database may store employee data, and a base table can be created from the database. Three queries may be directed to the base table regarding employee 1. The first query may ask for employee 1's salary and visual image, the second query may ask for employee 1's address and visual image, and the third query may ask for just a visual image of employee 1. The result (data) for the three common queries can be located in the same row in the base table. In this embodiment, a database manager can generate three MQTs for each query. MQT 1 can be generated to provide the data for employee 1's salary and visual image, MQT 2 can be generated to provide the data for employee 2's address and visual image, and MQT 3 can be generated to provide the data for the visual image of employee 1. As a result, the same row may be copied to all three MQTs. However, according to various embodiments, the database manager can determine that the data the memory size for the object representing the visual image of employee 1 exceeds a threshold memory size. The row may then be copied to MQT 1 along with the data for the visual image of employee 1. When MQT 2 and MQT3 are created, the row does not include the data for the visual image because a reference pointer is created to refer to the storage location of the data used by MQT 1. The system can then respond to a subsequent access to MQT 2 or MQT 3 by using the reference pointer to locate storage location associated with MQT 1 and the data for the visual image can be retrieved. Sharing the large amount of data between the MQTs in this manner can be particularly useful for alleviating the system from storing the large amount of data multiple times and allowing an efficient response to queries.

FIG. 1 depicts a computer system 100 for creating an MQT for data from a base table, consistent with embodiments of the present disclosure. As shown, the system can include a database storage server 102, communication network 140, and clients 118, 120, 122. The system can include one or more computer processors, memories and related hardware components that are configured consistent with the discussion herein.

Various embodiments of the database storage server 102 can include storage devices 104 and a database manager 110. Database storage server 102 can allow a computer (e.g., servers, personal computers, and mobile devices) to store large amounts of data, which can be searched by a user in order to retrieve specific information in storage devices 104, 128, and 130. Storages devices 104, 128, and 130 can be devices (e.g., single in-line memory modules, dual in-line memory modules, hard disks, magnetic tapes, and compact discs) on which a database 106, a base table 108, and MQTs 116, 136, and 138 can be stored. Data stored in the database 106 can be arranged into tables, such that the tables have rows and columns of data. In certain embodiments, a table that can exist in the storage device 104 is the base table 108 and the MQT 116.

In particular embodiments, as stated herein, accessing data from the base table 108 can be done using queries. A query can be sent from clients 118, 120, and 122. As shown, in some embodiments, clients 120 and 122 can be communicatively coupled to the data storage server 102 using one or more communication networks 140. The network 140 may include wide area networks (such as the Internet), local area networks that can include one or more servers, networks, or databases, and may use a particular communication protocol to transfer data between the entities included in system 100.

Queries sent from clients 118, 120, and 122 can be logical statements that, according to certain embodiments, can be evaluated by database managers 110, 124, or 126. The queries can then be used to retrieve data from the base table 108. For example, database storage server 102 can be a server that houses storage 104 that contains data for an enterprise. The base table 108 can contain data about the employees of the enterprise, with columns in the base table that represent the employee's name, address, phone number, gender, and salary. A query can then be used to retrieve the records for all exempt employees that have a salary greater than $60,000. Similarly, a query can be used to retrieve the records for all employees that have a particular area code or telephone prefix.

Consistent with various embodiments, identical or closely related queries can be issued multiple times. To respond to queries, the database managers 110, 124, and 126 may have to perform numerous join operations because the base table contains the data required to provide the results to the queries. When the base table contains large amounts of data, queries directed to the base table can take a long time to execute.

Particular embodiments can have the database manager 110, 124, and 126 store the results of queries in MQTs 116, 136, and 138. The database manager can be located at a central location 110, or can be located in multiple locations 110, 124, and 126 (e.g., using a federated database that is spread around multiple nodes). The MQTs 116, 136, and 138 can contain the rows or a subset of the rows from the base table 108. Therefore, a query made multiple times can be received and the results can be stored in the MQTs 116, 136, and 138. When the query is received again, the query can be directed to the MQT and the MQT can provide the result (data) to the query. By using the MQT, the time it would have taken gathering and delivering the data if the query would have been directed to the base table 108, can be reduced. In certain embodiments, using a process known as query rewrite, a query can be recognized by database managers 110, 124, and 126 and directed to the MQTs 116, 136, and 138 to provide the results to the query.

Furthermore, according to particular embodiments, indexes 114, 132, and 134 can be configured with index values that map the locations of the MQTs. Therefore, when a query is made, the location of rows for the MQT associated with the query can be found using the index. For cells containing LOB values, the index may identify a different storage location for the individual cell, relative to the location of the other cells in the row. In addition, multiple queries can be sent by client 120. In certain embodiments, the index 114 can be used to identify the MQTs that are needed to provide the results to each of the queries. Moreover, the index 114 can be used to facilitate sharing of rows or cells that are common to multiple MQTs. In certain instances, the decision on whether to share can be made for individual cells, as opposed to entire rows, and based upon the memory size of the cells.

As an example, client 120 sends query 1 for each employee's annual salary and query 2 for a visual image of each employee. Because there are multiple employees, queries 1 and 2 are made multiple times. As a result, the database manager 110 generates MQT 1 for query 1 and MQT 2 for query 2. Each employee may have a row of data in the base table 108 and each row can contain one column of data for the employee's salary and one column of data for a visual image of the employee. The database manager may determine that the data for a visual image of certain employees is large and above a threshold memory size. If the visual image data were to be copied several times in both MQT 1 and MQT 2, the performance of the system 100 may suffer. The database manager may then generate MQT 1 by creating a materialized table that includes all the relevant rows of data for the employees. The database manager may then generate MQT 2 by creating a materialized table that includes all relevant rows of data for the employees, while using, for cells above a memory threshold, pointers back to MQT 1. In some instances, the system can use reference pointers that point to the visual image data located in base table 108. Whether the data is stored in another MQT or in the base table, index 114 can be used to locate the shared location for such data.

Figure 2:
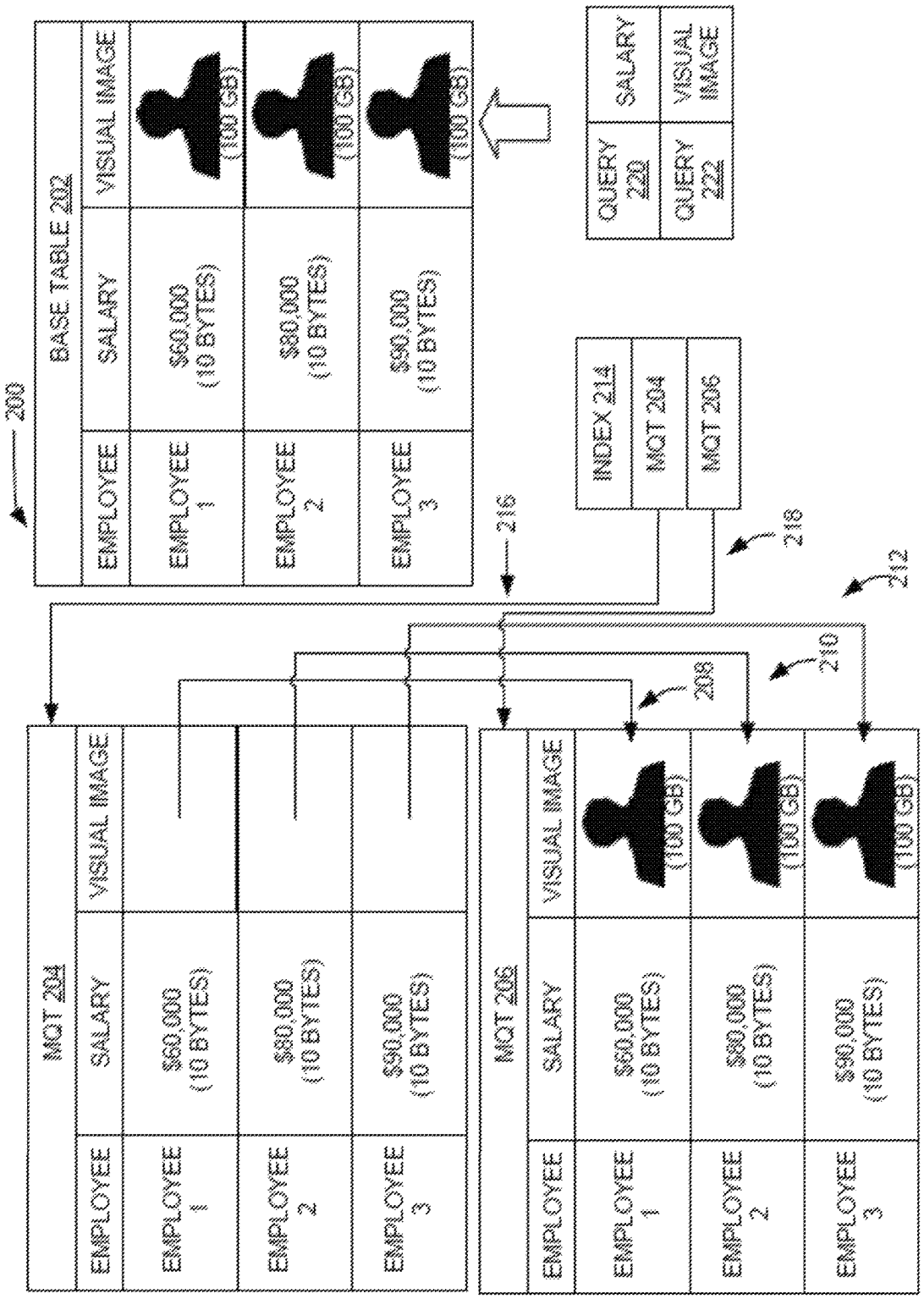
FIG. 2 depicts an example 200 of generating MQTs that share data from a base table, consistent with embodiments of the present disclosure.

FIG. 2 depicts an example 200 of generating MQTs that share data from a base table, consistent with embodiments of the present disclosure. In particular embodiments, the example 200 can include a base table 202, MQTs 204, 206, an index 214, and queries 220, 222. The base table 202 can include a superset of data relative to the MQTs, which include a subset of data defined by their respective queries. This is both in the horizontal sense (columns) and in the vertical sense (Rows). For ease of discussion, these additional columns and rows are not depicted in the base table. Moreover, each of the MQTs may have more or less columns than is depicted. For example, a first MQT might have columns 1 and 3 while another MQT might have columns 2 and 3, where 3 is the LOB column. For ease of discussion, the columns are shown as being common between the MQTs.

According to various embodiments, queries 220 and 222 can be made to the base table 202 from a client (e.g. clients 118, 120, and 122, from FIG. 1). Query 220 can be made for employee 1, 2, and 3's salary and query 222 can be made for a visual image of employees 1, 2, and 3. In certain embodiments, a database manager (e.g., database manager 110 and 126, from FIG. 1) may recognize that queries 220 and 222 have been issued multiple times (in this example instance, each query has or will be issued 3 times and each row has or will be queried twice) and the database manager can decide to generate MQTs 204 and 206 for queries 222 and 220, respectively. In certain embodiments, MQT 206 can be generated first for query 220 and the data for rows for employees 1, 2, and 3 can be stored to create MQT 206. When query 222 is subsequently issued, the database manager may then determine whether the storage size of the data in each column of the rows for employees 1, 2, and 3 are above a threshold memory size. As discussed herein, the threshold memory size can be determined based on many factors, including but not limited to, the storage capacity of a system (e.g., database storage server 102, client 118, and client 122), preference settings set by the database manager or a human administrator, and the number of join operations required to retrieve a result to a query.

In certain embodiments, the database manager may determine that the storage size of the data for employee 1, 2, and 3's salary (in this case, 10 bytes) is below the threshold memory size and copy the data into MQT 204. The database manager may then determine that the storage size of the data for the visual image of employees 1, 2, and 3 (in this case, 100 gigabytes) is above the threshold memory size. The database manager can then include reference pointers 208, 210, and 212 with MQT 204. Reference pointer 208 can provide the location of the data for the visual image of employee 1 by pointing to the storage location for the corresponding cell in MQT 206. Similarly, reference pointer 210 can provide the storage location of the data for the visual image of employee 2, and reference pointer 212 can provide the storage location of the data for the visual image of employee 3.

In particular embodiments, index 214 can be configured to include storage space pointers 216 and 218. If or when query 222 is made to the base table 202 for employee 1, 2, or 3's visual image, the database manager can access index 214 and use storage space pointer 216 to locate MQT 204. If query 222 was made for employee 1's visual image, reference pointer 208 can be used to locate the cell in MQT 206 for employee 1's visual image data. The data can then be retrieved from MQT 206 to satisfy query 222. Similarly, reference pointers 210 and 212 can be used to locate the data for the visual image of employee 2 or employee 3 to satisfy query 222. In addition, if or when query 220 is made to the base table 202 for employee 1, 2, or 3's salary, the database manager can access index 214 and use storage space pointer 218 to locate MQT 206. If query 220 was made for employee 1's salary, the cell in MQT 206 of the data for employee 1's salary can be located and the data can be retrieved to satisfy query 220. Similarly, storage space pointer 218 can be used to locate MQT 206 and the data for employee 2 and employee 3's salary can be retrieved to satisfy query 220.

Consistent with embodiments, an index can be generated for each MQT and can include references to other MQTs. For instance, the index for MQT 1 can be generated according to the following pseudo code:

```
create index mqtIndex on mqt1 (LobColumnName); //syntax
data, mqt, offset or ptr                       //index structure
---------------------------------
'abc' 1 000000002780
'xyz' 1 000000005784
'def' 2 000000001234
```

In this example, the data from MQT1 and corresponding to "def" is stored in a location corresponding to MQT2 and the offset "1234". The index for MQT2 would also include a corresponding index entry for the "def" data, which would indicate that the data was stored as part of MQT2. The index for MQT2 could also include pointers to other MQTs, including but not limited to, MQT2.

In various embodiments, MQTs 204 and 206 can be further configured with a share parameter that can be used to determine whether an MQT will share data with another MQT. For example, if MQT 206 is to share the visual image data for employees 1, 2, and 3, MQT 206 can have the share parameter set to 'Yes'. Therefore, the rows from the base table 202 that are included in MQT 206 can be shared with MQT 204 (assuming they meet other criteria, such as the memory threshold size). However, if sharing is not desired for MQT 206, MQT 206 can have the share parameter set to 'No'. As a result, the rows from the base table that are included in MQT 206 will not be shared with MQT 204 and pointers will not be generated to or from MQT 206. In certain embodiments, as will be discussed in connection with FIG. 4, reference pointers 208, 210, and 212 can be configured to point back to the base table 202 to locate the visual image data for employees 1, 2, and 3.

In particular embodiments, the share parameter can be manually set by a user. In some embodiments, the system can be configured to automatically set the share parameter based upon a set of configuration rules. This can allow either a user or the system to set the share parameter. For example, MQT 206 is defined to be 'User Maintained' and a user sets MQT 206's share parameter to 'Yes'. Therefore, the rows from the base table that are included in MQT 206 can be shared by other MQTs. In addition, MQT 204 is defined to be 'System Maintained' and the MQT 204's share parameter is set to 'Yes'. Because MQT 204's share parameter is set to 'Yes' and MQT 206's share parameter is set to 'Yes', the employee's visual image data located in MQT 206 can be shared with MQT 204, as opposed to storing another copy of the visual image data for MQT 204.

In various embodiments, the data in the database or the base table may be changed (e.g., some or all of the data in the base table rows are inserted, updated or deleted). To maintain consistency with the changes, the MQTs may be refreshed (e.g., updated or changed). In certain embodiments, the MQTs with a share parameter set to 'Yes' will each have the same refresh schedule. For instance, if MQT 204 and 206 have their share parameters set to 'Yes' then they will be refreshed at a rate that satisfies the refresh requirements of all MQTs. If MQT 204 and has its share parameters set to 'Yes' and MQT 206 has its share parameter set to 'No', then MQT 204 will be refreshed at a rate that satisfies the refresh requirements for other generated MQTs (not shown in FIG. 2). However, MQT 206 can have a separate refresh rate.

In another embodiment, the system can be configured to have MQTs that have the share parameter set to 'Yes' share a refresh schedule with the base table 202. The refresh rate for these MQTs can be set according to the respective requirements of the base table and other MQTs. Moreover, the remaining MQTs with the share parameter set to 'No' can be refreshed at a rate that is consistent with their respective MQT refresh requirements. For example, if MQT 206 has its share parameter set to 'No' then MQT 206 does not share the visual image data with MQT 204 and MQT 206 can have a refresh schedule set according to the specific refresh requirements of MQT 206. MQT 204 can have its share parameter set to 'Yes' and MQT 204 can be configured with reference pointers that point back to the base table to locate the employee's visual image data. MQT 204 can then be refreshed at a rate that satisfies the requirements of both MQT 204 and the base table.

Consistent with embodiment, MQTs that are share a memory location for a LOB can get out of synchronization when they have different refresh rates (e.g., due to a manual refreshing of one MQT). If this occurs, then the system can be configured to stop sharing and instantiate a version of the LOB for each MQT. For example MQT1 and MQT2 start by sharing a memory location of a LOB that exists separate from the base table. The base table changes the data for the LOB such that MQT1 and MQT2 are pointing to the memory location with an old version of the LOB. If MQT1 is manually refreshed but MQT2 is not, then the system can stop the sharing and instantiate a version of the LOB for MQT1 at a new memory location. MQT2 will remain pointed to the old version of the LOB until it is also refreshed, at which point sharing could be resumed by pointing MQT2 to the new memory location. In certain embodiments, the system can be configured to transfer ownership of the LOB to MQT2.

Figure 3:
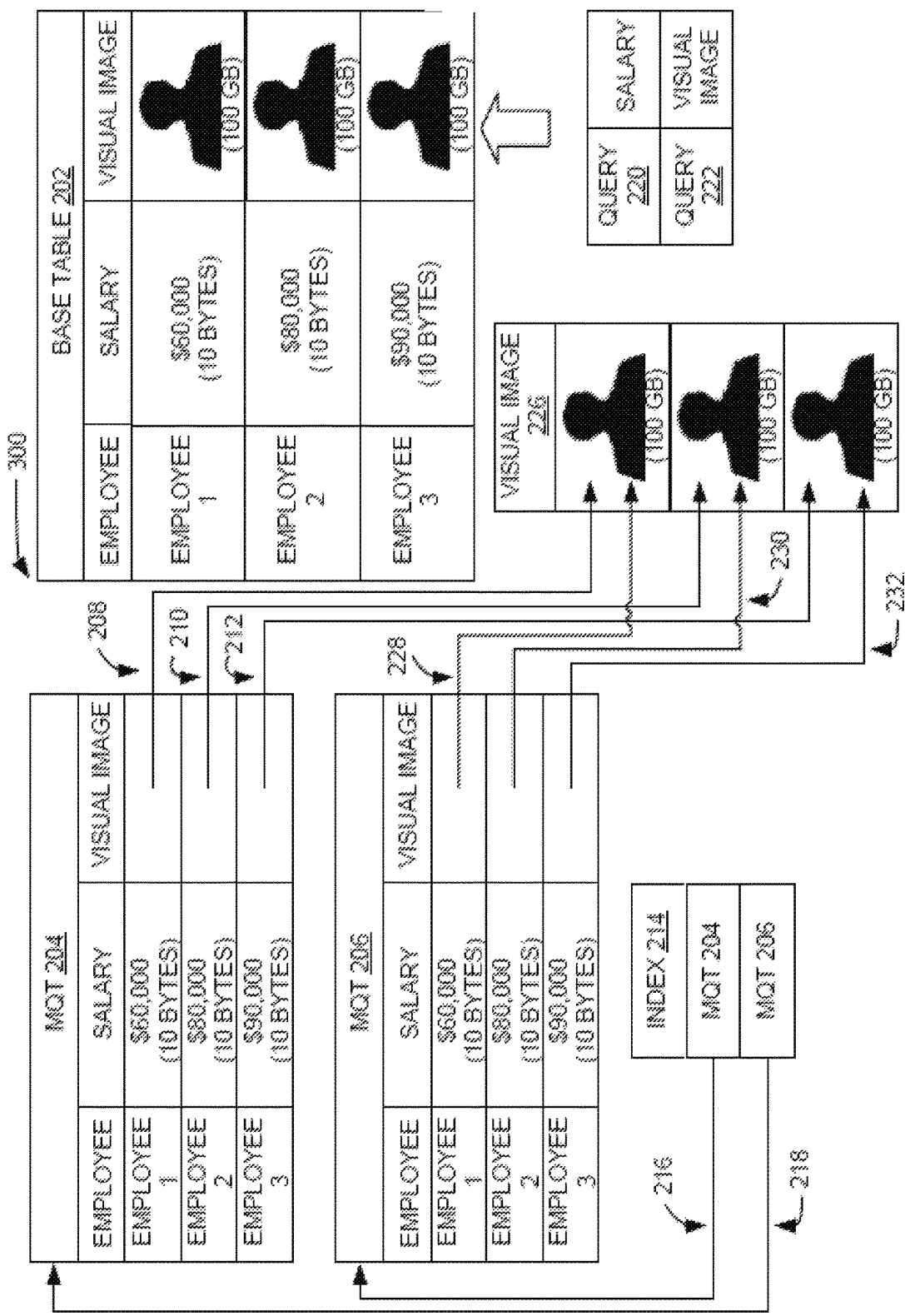
FIG. 3 depicts an example 300 of generating MQTs that share data from a base table, consistent with embodiments of the present disclosure.

FIG. 3 depicts an example 300 of generating MQTs that share data from a base table, consistent with embodiments of the present disclosure. In particular embodiments, the example can include a base table 202, MQTs 204, 206, an index 214, a visual image storage application 226, and queries 220, 222.

In various embodiments, the example 300 illustrated using FIG. 3 is similar to the example illustrated using FIG. 2. According to embodiments, queries 220 and 222 can be made to the base table 202 from a client. Query 220 can be made for employee 1, 2, and 3's salary and query 222 can be made for a visual image of employees 1, 2, and 3. A database manager may recognize that queries 220 and 222 have been made multiple times and the database manager can decide to generate MQTs 204 and 206 for queries 220 and 222. The database manager can first determine whether the storage size of the data in each column of the rows for employees 1, 2, and 3 are above a threshold memory size. The database manager may then determine that the storage size of the data for employee 1, 2, and 3's salary (in this case, 10 bytes) is below the threshold memory size and copy the data into MQT 204 and MQT 206. The database manager may then determine that the storage size of the data for the visual image of employees 1, 2, and 3 (in this case, 100 gigabytes) is above the threshold memory size. The database manager may then generate the visual image storage application 226 and copy the visual image data into the memory location where the different MQTs can reference the data.

According to certain embodiments, the database manager can then include reference pointers 208, 210, and 212 with MQT 204 and reference pointers 228, 230, and 232 with MQT 206. Reference pointer 208 can provide the location of the data for the visual image of employee 1 by pointing to the cell in the visual image storage application 226 where employee 1's visual image data is stored. Similarly, reference pointer 210 can provide the location of the data for the visual image of employee 2 by pointing to the cell in the visual image storage application 226 where employee 2's visual image data is stored, and reference pointer 212 can provide the location of the data for the visual image of employee 3 by pointing to the cell in the visual image storage application where employee 3's visual image data is stored.

In particular embodiments, similar to FIG. 2, index 214 can be configured to include storage space pointers 216 and 218 that the database manager can access and use to locate MQTs 204 and 206. If query 222 is made for employee 1's visual image, storage space pointer 216 can be used to locate MQT 204. Reference pointer 208 can then be used to locate the cell in the visual image storage application 226 for the visual image data of employee 1. The data can then be retrieved from the visual image storage application to satisfy query 222. Similarly, reference pointers 210 and 212 can be used to locate the data for the visual image of employee 2 or employee 3 to satisfy query 222. In addition, if or when query 220 is made to the base table 202 for employee 1, 2, or 3's salary, the database manager can access index 214 and use storage space pointer 218 to locate MQT 206. If query 220 was made for employee 1's salary, the cell in MQT 206 of the data for employee 1's salary can be located and the data can be retrieved to satisfy query 220. Similarly, storage space pointer 218 can be used to locate MQT 206 and the data for employee 2 and employee 3's salary can be retrieved to satisfy query 220.

In various embodiments, MQTs 204 and 206 can be further configured with a share parameter. As a result, MQTs 204 and 206 in example 300 may be configured similar to MQTs 204 and 206 from example 200. However, the visual image storage application 226 can provide another option when MQTs change their share parameter. For example, as depicted in FIG. 2, MQT 204 is configured with reference pointers 208, 210, and 212 that point to MQT 206. If MQT 206's share parameter was then changed from 'Yes' to 'No', the reference pointers 208, 210, and 212 can no longer point to MQT 206. As a result, reference pointers 208, 210, and 212 can point to the visual image storage application 226 as depicted in FIG. 3. This can be useful because, in particular embodiments, the base table 202 can have a frequent refresh schedule and it is desirable that the data retrieved from MQT 204 is refreshed less frequently. Therefore, since the reference pointers 208, 210, and 212 can point to the visual image storage application 226 instead of the base table 202, the data retrieved from the visual image storage application may not be refreshed as frequently as the data in the base table.

Figure 4:
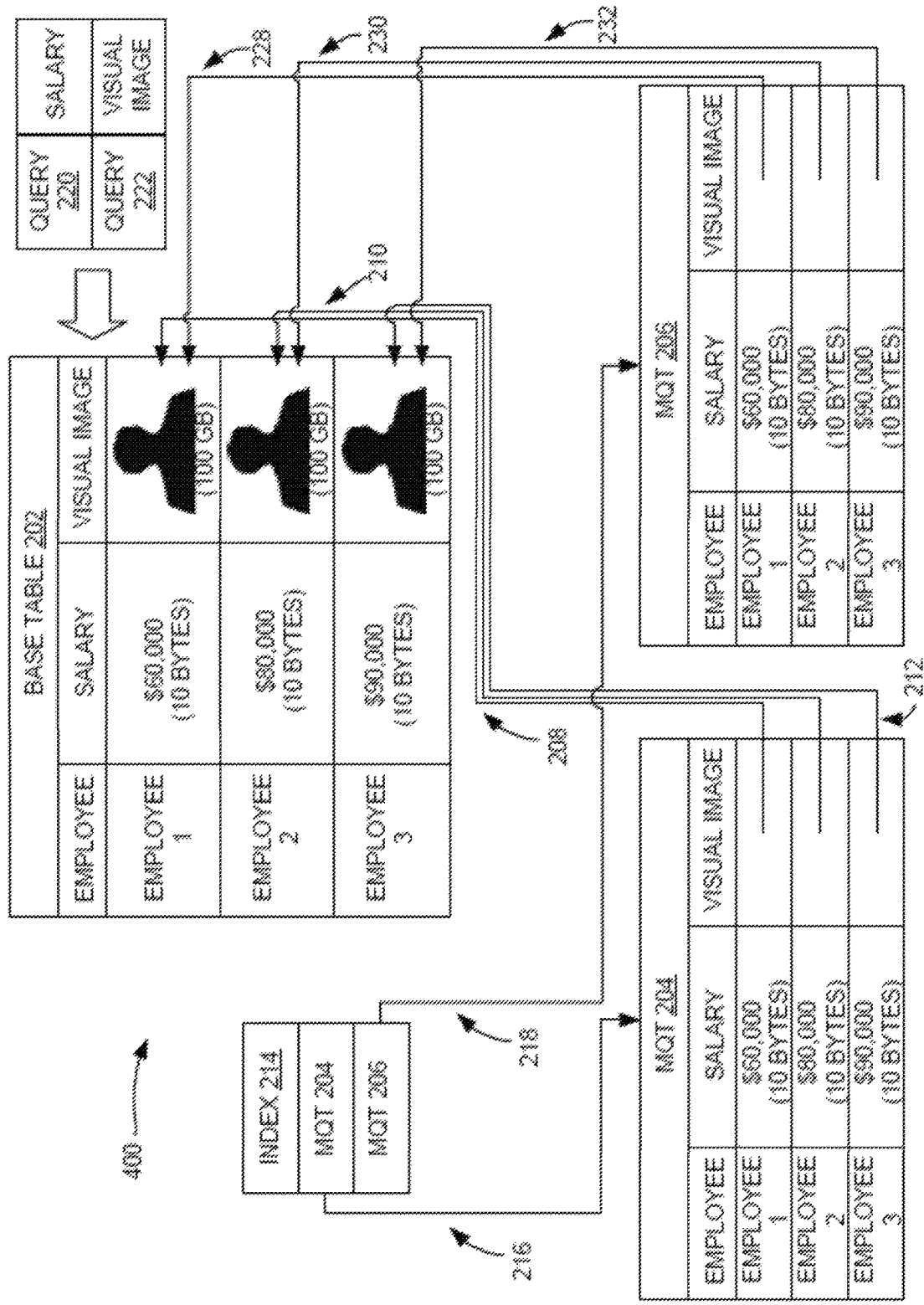
FIG. 4 depicts an example 400 of generating MQTs that share data from a base table, consistent with embodiments of the present disclosure.

FIG. 4 depicts an example 400 of generating MQTs that share data from a base table, consistent with embodiments of the present disclosure. In particular embodiments, the example 400 can include a base table 202, MQTs 204, 206, and queries 220, 222. Furthermore, MQTs 204 and 206 can be configured to include share parameters similar to MQTs 204 and 206 of FIG. 2.

In various embodiments, the example 400 is similar to the example 200. According to various embodiments, queries 220 and 222 can be made to the base table 202 from a client. Query 220 can be made for employees 1, 2, and 3's salary and query 222 can be made for a visual image of employees 1, 2, and 3. A database manager may recognize that queries 220 and 222 have been made multiple times and the database manager can decide to generate MQTs 204 and 206 for queries 220 and 222. The database manager can first determine whether the storage size of the data in each column of the rows for employees 1, 2, and 3 is above a threshold memory size. The database manager may then determine that the storage size of the data for employee 1, 2, and 3's salary (in this case, 10 bytes) is below the threshold memory size and copy the data into MQT 204 and MQT 206. The database manager may then determine that the storage size of the data for the visual image of employees 1, 2, and 3 (in this case, 100 gigabytes) is above the threshold memory size and not make a copy of the visual data.

According to certain embodiments, the database manager can then include reference pointers 208, 210, and 212 with MQT 204 and reference pointers 228, 230, and 232 with MQT 206. Reference pointer 208 can provide the location of the data for the visual image of employee 1 by pointing to the cell in the base table 202 where the row for employee 1 and the column for the visual image intersect. Similarly, reference pointer 210 can provide the location of the data for the visual image of employee 2 by pointing to the intersection of the row for employee 2 and the column for the visual image and reference pointer 212 can provide the location of the data for the visual image of employee 3 by pointing to the intersection of the row for employee 3 and the column for the visual image.

In particular embodiments, similar to FIG. 2, index 214 can be configured to include storage space pointers 216 and 218 that the database manager can access and use to locate MQTs 204 and 206. If query 222 is made for employee 1's visual image, storage space pointer 216 can be used to locate MQT 204. Reference pointer 208 can then be used to locate the cell in the base table 202 for the visual image data of employee 1. The data can then be retrieved from the base table to satisfy query 222. Similarly, reference pointers 210 and 212 can be used to locate the data for the visual image of employee 2 or employee 3 to satisfy query 222. In addition, if or when query 220 is made to the base table 202 for employee 1, 2, or 3's salary, the database manager can access index 214 and use storage space pointer 218 to locate MQT 206. If query 220 was made for employee 1's salary, the cell in MQT 206 of the data for employee 1's salary can be located and the data can be retrieved to satisfy query 220. Similarly, storage space pointer 218 can be used to locate MQT 206 and the data for employee 2 and employee 3's salary can be retrieved to satisfy query 220.

The present disclosure is also directed toward embodiments that can dynamically alternate between the examples 200, 300, and 400. For example, MQT 204 and MQT 206 can be configured with reference pointers that point back to the base table 202, as shown in FIG. 4. MQT 204 and MQT 206 can be refreshed at different times, and the base table can have a large amount of data (e.g., visual image data) that has been changed at a time, causing the large amount of data pointed to by MQT 204 to be different from the large amount of data pointed to by MQT 206. As a result, in certain embodiments, a storage application can be generated (e.g., visual image storage application from FIG. 3) and a copy of the large amount of data can be made before it is changed in the base table. The copy can then be stored in the storage application and the reference pointers included with MQT 204 and MQT 206 can be dynamically redirected to point to the storage application. In another embodiment, a copy of the large amount of data can be made before it is changed in the base table. The copy can then be stored in both MQT 204 and MQT 206.

Figure 5:
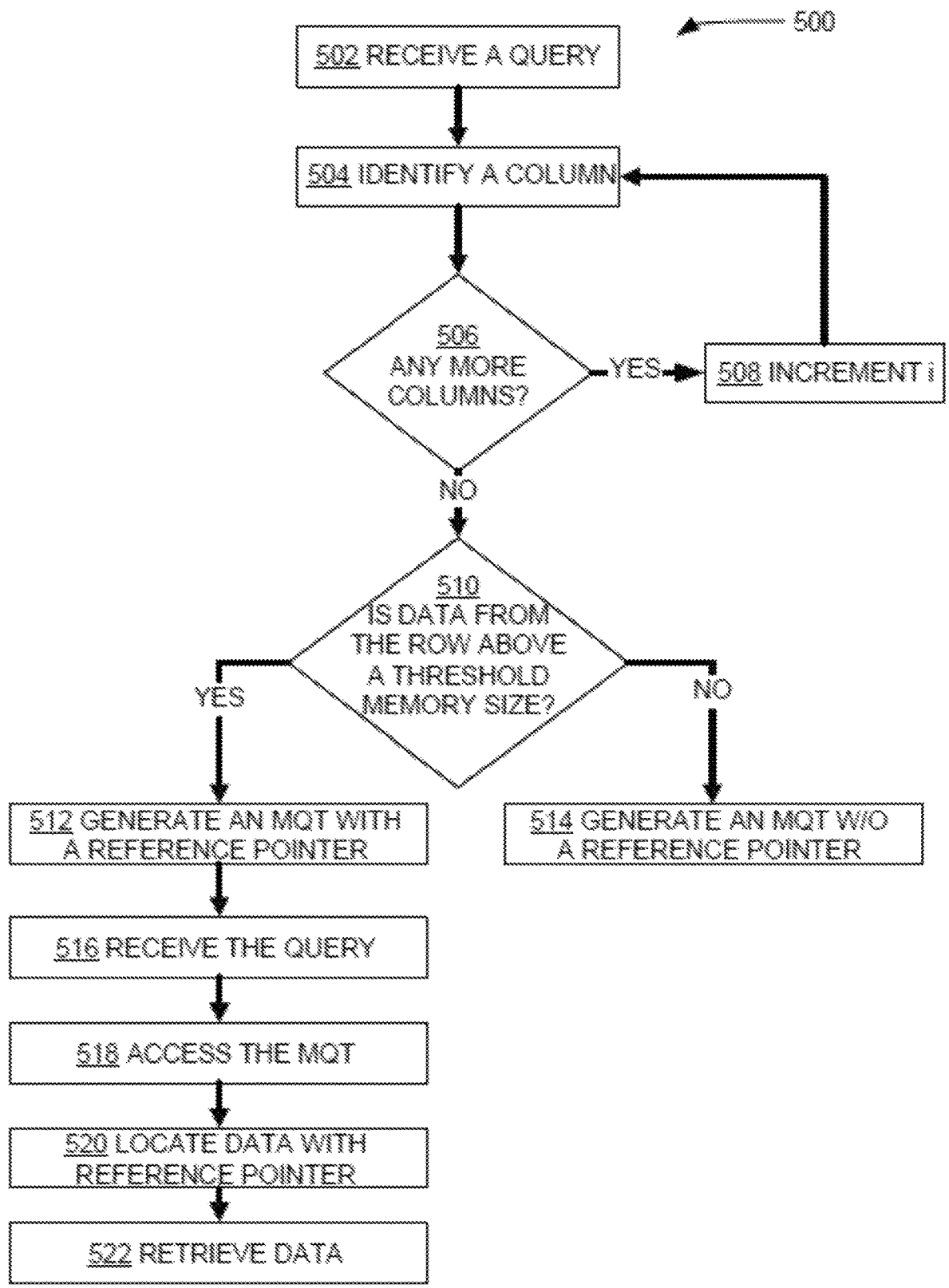
FIG. 5 depicts a method 500 of generating MQTs that share data from a base table, consistent with embodiments of the present disclosure.

FIG. 5 depicts a method 500 of generating MQTs that share data from a base table, consistent with embodiments of the present disclosure. In operation 502, a query can be received. The query can be made to one or more rows of a base table and each row can have a plurality of columns. Furthermore, the query can be recognized as having been made multiple times. In operation 504, a column (i) that stores data can be identified. In operation 506, it can be determined if there are any more columns in the row. If there are, in operation 508, the method 500 can increment to the next column (i+1) and operations 504-506 can repeat. If there are not anymore columns, in operation 510, it can be determined whether any of the columns have data that is above a threshold memory size. As stated herein, the threshold memory size can be determined based on many factors, including but not limited to, the storage capacity of a system (e.g., database storage server 102, client 118, and client 122), preference settings set by the database manager or a human administrator, and the number of join operations required to retrieve a result to a query. In certain embodiments, the threshold can dynamically change in response to system and usage parameters. For example, a threshold can be automatically adjusted based upon the amount of memory that is allocated to queries and/or jobs, or in response to a change in the available memory (e.g., due to a change in the memory allocated to a virtual machine). If there is data from the row that is above the threshold memory size, in operation 512, an MQT can be generated that includes a reference pointer that points to the data. However, if there is no data from the row that is above the threshold memory size, in operation 514, an MQT can be generated that stores a copy of the row.

In operation 516, the query can be received again. In certain embodiments, an index can be used to locate the MQT. The index can be configured to include storage space pointers that point to storage spaces and there can be at least one pointer to the MQT. Using the pointer, the MQT can be located, and in operation 518, the generated MQT can be accessed. Using the reference pointer included with the MQT, in operation 520, the data can be located. In operation 522, the data can then be retrieved to satisfy the query.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
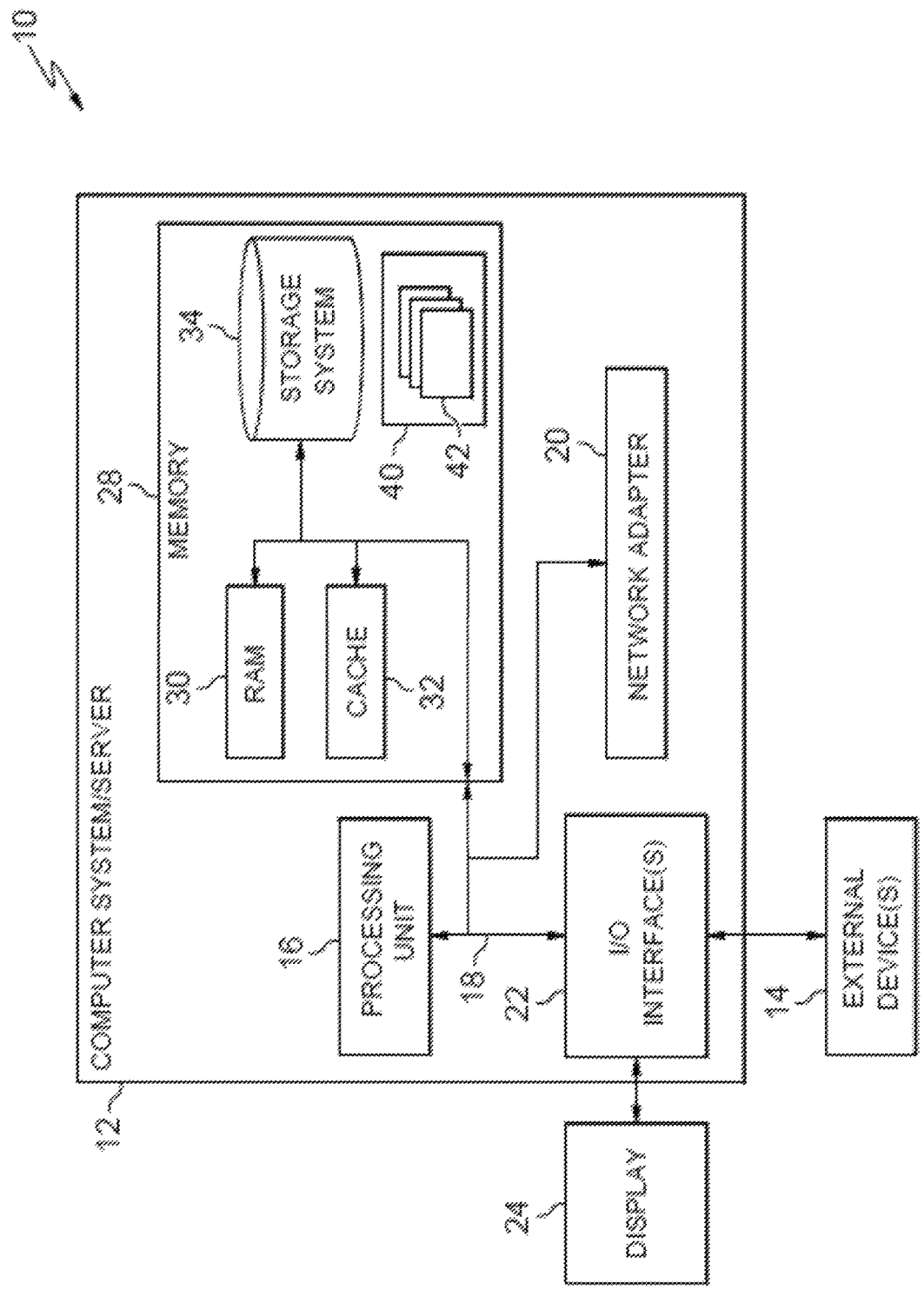
FIG. 6 depicts a cloud computing node, according to embodiments of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein above.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
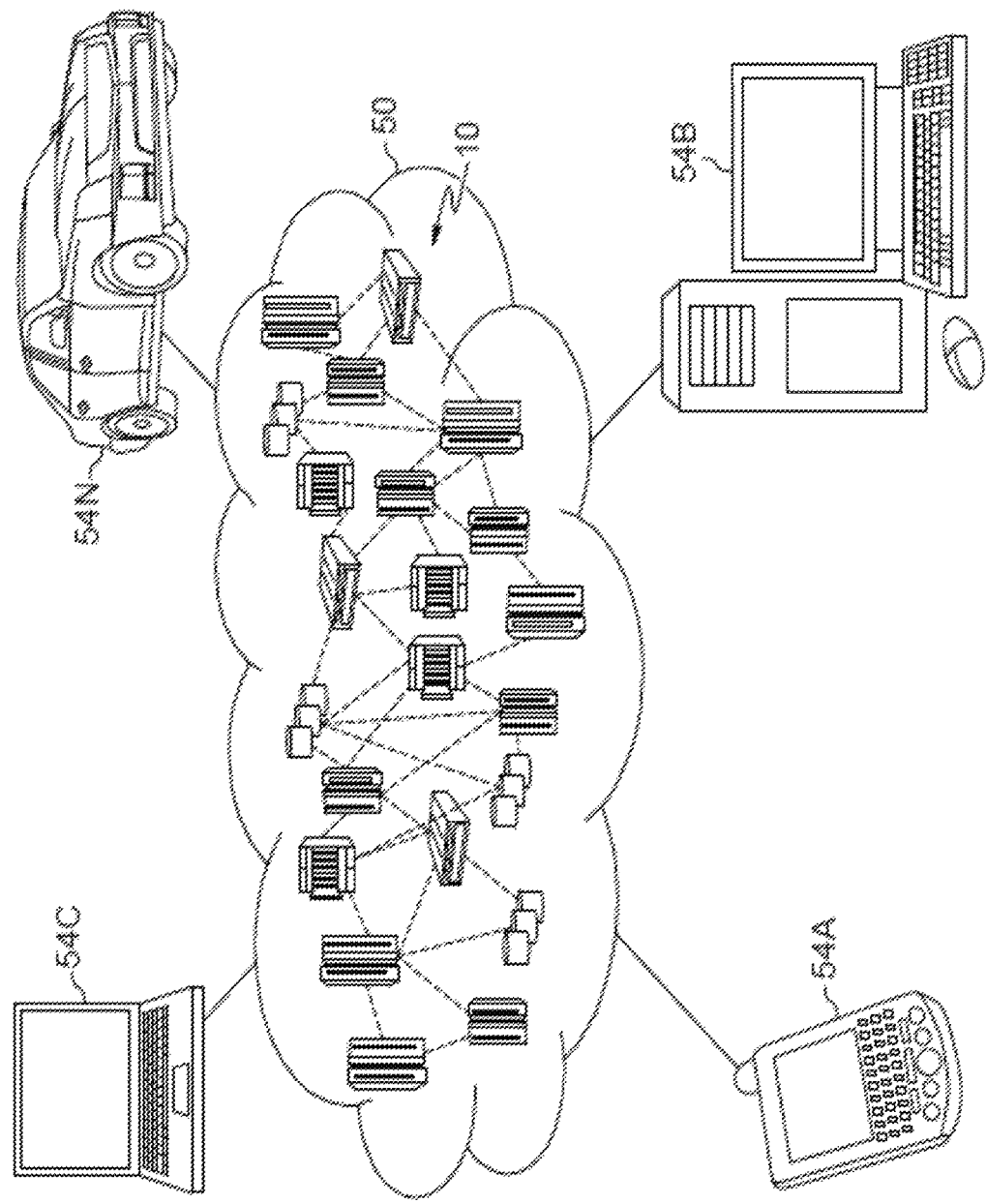
FIG. 7 depicts a cloud computing environment, according to embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
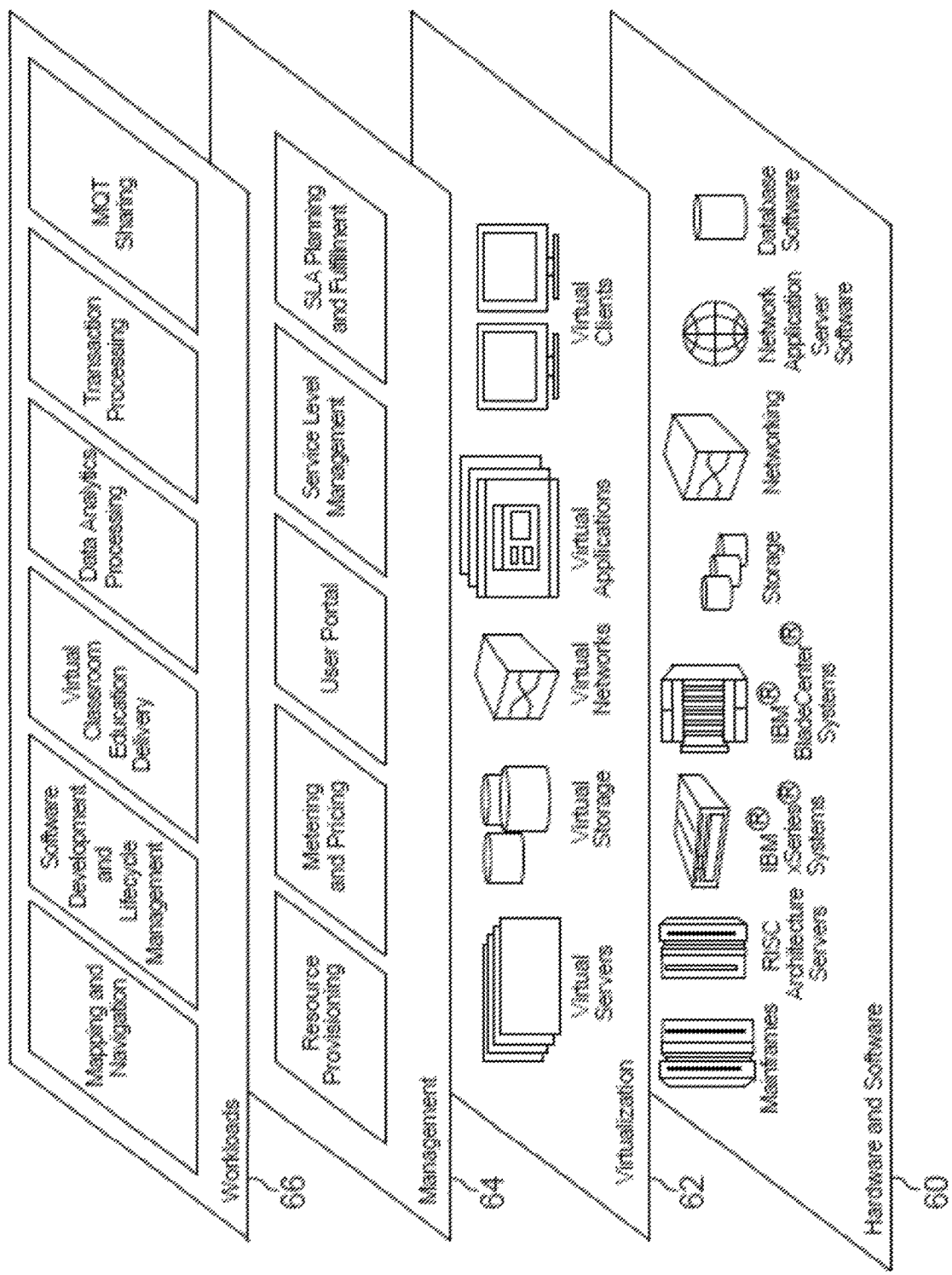
FIG. 8 depicts abstraction model layers, according to embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided: Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and generating shared MQT data.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for generating a materialized query table (MQT) for data from a base table having a plurality of rows and columns that contain stored data, the method comprising:
receiving a query to retrieve data stored in a row from the base table;
identifying a first cell and a second cell in the base table, the first cell corresponding to a first column in the row, the second cell corresponding to a second column in the row;
determining that data in the first cell is above a threshold memory size, wherein the threshold memory size is set by a database manager;
determining, based on a share parameter of the base table, that the base table is permitted to share the data stored in the first cell with a first MQT, wherein the share parameter of the base table is automatically configured based upon a set of configuration rules;
generating, in response to determining that the data stored in the first cell is above the threshold memory size, the first MQT, wherein the first MQT contains the data for the second cell and has a first reference pointer in place of the data of the first cell, and wherein the first reference pointer indicates a location of the data stored in the first cell;
determining, based on a share parameter of the first MQT, that the first MQT is permitted to share the data with a second MQT, wherein the share parameter of the first MQT is automatically configured based upon a second set of configuration rules; and
generating the second MQT, wherein the second MQT contains data for a third cell and has a second reference pointer in place of the data of the first cell, and wherein the second reference pointer indicates a location of the first reference pointer in the first MQT.

2. The method of claim 1, wherein the second MQT has a first refresh schedule that is different from a second refresh schedule of the first MQT and further comprising setting the first and second refresh schedules to a common refresh rate.

3. The method of claim 1, further comprising:
receiving another query to the row;
accessing the first MQT in response to receiving the another query;
locating, based on the first reference pointer, the data of the first cell; and
retrieving the data of the first cell.

4. The method of claim 1, further comprising:
accessing an index that points to a shared storage location for the first MQT and the second MQT, wherein the first MQT and the second MQT each include the first cell; and
retrieving, in response to another query to one of the first MQT or the second MQT and based upon the index, data of the first cell.

5. A database manager system for creating a materialized query table (MQT) for data from a base table having a plurality of rows and columns that contain stored data, the system comprising: one or more computer processor circuits configured to:
receive a query to retrieve data stored in a row from the base table;
identify a first cell and a second cell in the base table, the first cell corresponding to a first column in the row, the second cell corresponding to a second column in the row;
determine that data in the first cell is above a threshold memory size, wherein the threshold memory size is set by a database manager;
determine, based on a share parameter of the base table, that the base table is permitted to share the data stored in the first cell with a first MQT, wherein the share parameter of the base table is automatically configured based upon a set of configuration rules;
generate, in response to determining that the data stored in the first cell is above the threshold memory size, the first MQT, wherein the first MQT contains the data for the second cell and has a first reference pointer in place of the data of the first cell, and wherein the first reference pointer indicates a location of the data stored in the first cell;
determine, based on a share parameter of the first MQT, that the first MQT is permitted to share the data with a second MQT, wherein the share parameter of the first MQT is automatically configured based upon a second set of configuration rules; and
generate the second MQT, wherein the second MQT contains data for a third cell and has a second reference pointer in place of the data of the first cell, and wherein the second reference pointer indicates a location of the first reference pointer in the first MQT.

6. The system of claim 5, wherein the one or more computer processor circuits are further configured to store the data of the first cell in a storage application that has a first refresh schedule that is different from a second refresh schedule of the base table.

7. The system of claim 5, wherein the one or more computer processor circuits are further configured to:
receive another query to the row;
access the first MQT in response to receiving the another query;
locate, based on the first reference pointer, the data of the first cell; and
retrieve the data of the first cell.

8. The system of claim 7, wherein the one or more computer processor circuits are further configured to:
access an index having a plurality of storage space pointers that point to storage spaces, each storage space pointed to by at least one storage space pointer; and
locate the first MQT based on a storage space pointer from the plurality of storage space pointers.

9. A computer program product for generating a materialized query table (MQT) for data from a base table having a plurality of rows and columns that contain stored data, the computer program product comprising a computer readable storage medium having program instructions embodied therewith, wherein the computer readable storage medium is not a transitory signal per se, the program instructions executable by a processing circuit to cause the processing circuit to perform a method comprising:
receiving a query to retrieve data stored in a row from the base table;

identifying a first cell and a second cell in the base table, the first cell corresponding to a first column in the row, the second cell corresponding to a second column in the row;

determining that data in the first cell is above a threshold memory size, wherein the threshold memory size is set by a database manager;

determining, based on a share parameter of the base table, that the base table is permitted to share the data stored in the first cell with a first MQT, wherein the share parameter of the base table is automatically configured based upon a set of configuration rules;

generating, in response to determining that the data stored in the first cell is above the threshold memory size, the first MQT, wherein the first MQT contains the data for the second cell and has a first reference pointer in place of the data of the first cell, and wherein the first reference pointer indicates a location of the data stored in the first cell;

determining, based on a share parameter of the first MQT, that the first MQT is permitted to share the data with a second MQT, wherein the share parameter of the first MQT is automatically configured based upon a second set of configuration rules; and generating the second MQT, wherein the second MQT contains data for a third cell and has a second reference pointer in place of the data of the first cell, and wherein the second reference pointer indicates a location of the first reference pointer in the first MQT.

10. The computer program product of claim 9, wherein the location of the data stored in the first cell is shared with a storage application that has a first refresh schedule that is different from a second refresh schedule of the base table.

11. The computer program product of claim 9, wherein the method further comprises:

receiving another query to the row;

accessing the first MQT in response to receiving the another query;

locating the data of the first cell based on the first reference pointer; and retrieving the data of the first cell.

\* \* \* \* \*